United States Patent
Sanders, II

(10) Patent No.: US 11,242,142 B1
(45) Date of Patent: Feb. 8, 2022

(54) VERTICAL TAKEOFF AND LANDING AIRCRAFT

(71) Applicant: Stanley Gordon Sanders, II, Sarasota, FL (US)

(72) Inventor: Stanley Gordon Sanders, II, Sarasota, FL (US)

( * ) Notice: Subject to any disclaimer, the term of this patent is extended or adjusted under 35 U.S.C. 154(b) by 260 days.

(21) Appl. No.: 16/351,473

(22) Filed: Mar. 12, 2019

Related U.S. Application Data

(60) Provisional application No. 62/641,874, filed on Mar. 12, 2018.

(51) Int. Cl.
| | |
|---|---|
| *B64C 29/02* | (2006.01) |
| *B64C 15/00* | (2006.01) |
| *B64C 17/04* | (2006.01) |
| *B64C 3/38* | (2006.01) |

(52) U.S. Cl.
CPC .............. *B64C 29/02* (2013.01); *B64C 3/38* (2013.01); *B64C 15/00* (2013.01); *B64C 17/04* (2013.01)

(58) Field of Classification Search
CPC ........... B64C 29/02; B64C 3/38; B64C 3/385; B64C 27/24; B64C 2027/8218
See application file for complete search history.

(56) References Cited

U.S. PATENT DOCUMENTS

| | | | |
|---|---|---|---|
| 5,863,013 A * | 1/1999 | Schmittle | B64C 29/0033 244/48 |
| 8,505,846 B1 | 8/2013 | Sanders | |
| 9,434,471 B2 * | 9/2016 | Ariton | B64C 7/00 |
| 10,054,939 B1 * | 8/2018 | Applewhite | B64C 39/024 |
| 2011/0036954 A1 * | 2/2011 | Piasecki | B64C 3/385 244/7 A |
| 2016/0046369 A1 * | 2/2016 | Watkins | B64C 5/02 244/7 A |
| 2017/0267379 A1 * | 9/2017 | Kobayakawa | F02K 9/80 |
| 2019/0168882 A1 * | 6/2019 | Jean-Fulcrand | B64C 27/00 |

* cited by examiner

*Primary Examiner* — Richard R. Green
*Assistant Examiner* — Ashesh Dangol
(74) *Attorney, Agent, or Firm* — Eric Karich; Karich & Associates

(57) ABSTRACT

An aircraft has a fuselage, and pivot wings pivotally connected with the fuselage, the pivot wings pivoting between a vertical orientation for vertical takeoff, and a horizontal orientation for horizontal flight. Ailerons on each of the pivot wings provide roll control for the aircraft in all phases of flight. A gimbal motor assembly is mounted on the fuselage to adjustably support a motor. An upper rotary pivot free wing is mounted on a mast driven by the motor. A vectored thrust mechanism is provided for forward movement of the aircraft.

4 Claims, 4 Drawing Sheets

VERTICAL TAKEOFF AND LANDING AIRCRAFT

CROSS-REFERENCE TO RELATED APPLICATIONS

This application for a utility patent claims the benefit of U.S. Provisional Application No. 62/641,874, filed Mar. 12, 2018.

BACKGROUND OF THE INVENTION

Field of the Invention

This invention relates to a vertical takeoff and landing (VTOL) aircraft.

Description of Related Art

The most similar prior art is described in U.S. Pat. No. 8,505,846, which teaches an aircraft that includes a fuselage which pivots between horizontal and vertical configurations, horizontal while parked and vertical for takeoff and landings. The aircraft uses a gimbal motor mounted rotary free wing for thrust vectored vertical flight and a gimbal motor mounted rotary free wing for thrust vectored horizontal flight.

SUMMARY OF THE INVENTION

The present invention teaches certain benefits in construction and use which give rise to the objectives described below.

The present invention provides an aircraft having a fuselage, and pivot wings pivotally connected with the fuselage, the pivot wings pivoting between a vertical orientation for vertical takeoff, and a horizontal orientation for horizontal flight. Ailerons on each of the pivot wings provide roll control for the aircraft in all phases of flight. A gimbal motor assembly is mounted on the fuselage to adjustably support a motor. An upper rotary pivot free wing is mounted on a mast driven by the motor. A means for providing vectored thrust is provided for forward movement of the aircraft.

A primary objective of the present invention is to provide an aircraft having advantages not taught by the prior art.

Another objective is to provide an aircraft that is able to take off vertically, and transition in flight to horizontal flight.

A further objective is to provide an aircraft that provides the benefits of both helicopter-type aircraft, as well as the benefits of traditional fixed wing aircraft.

Other features and advantages of the present invention will become apparent from the following more detailed description, taken in conjunction with the accompanying drawings, which illustrate, by way of example, the principles of the invention.

DETAILED DESCRIPTION OF THE INVENTION

Figure 1:
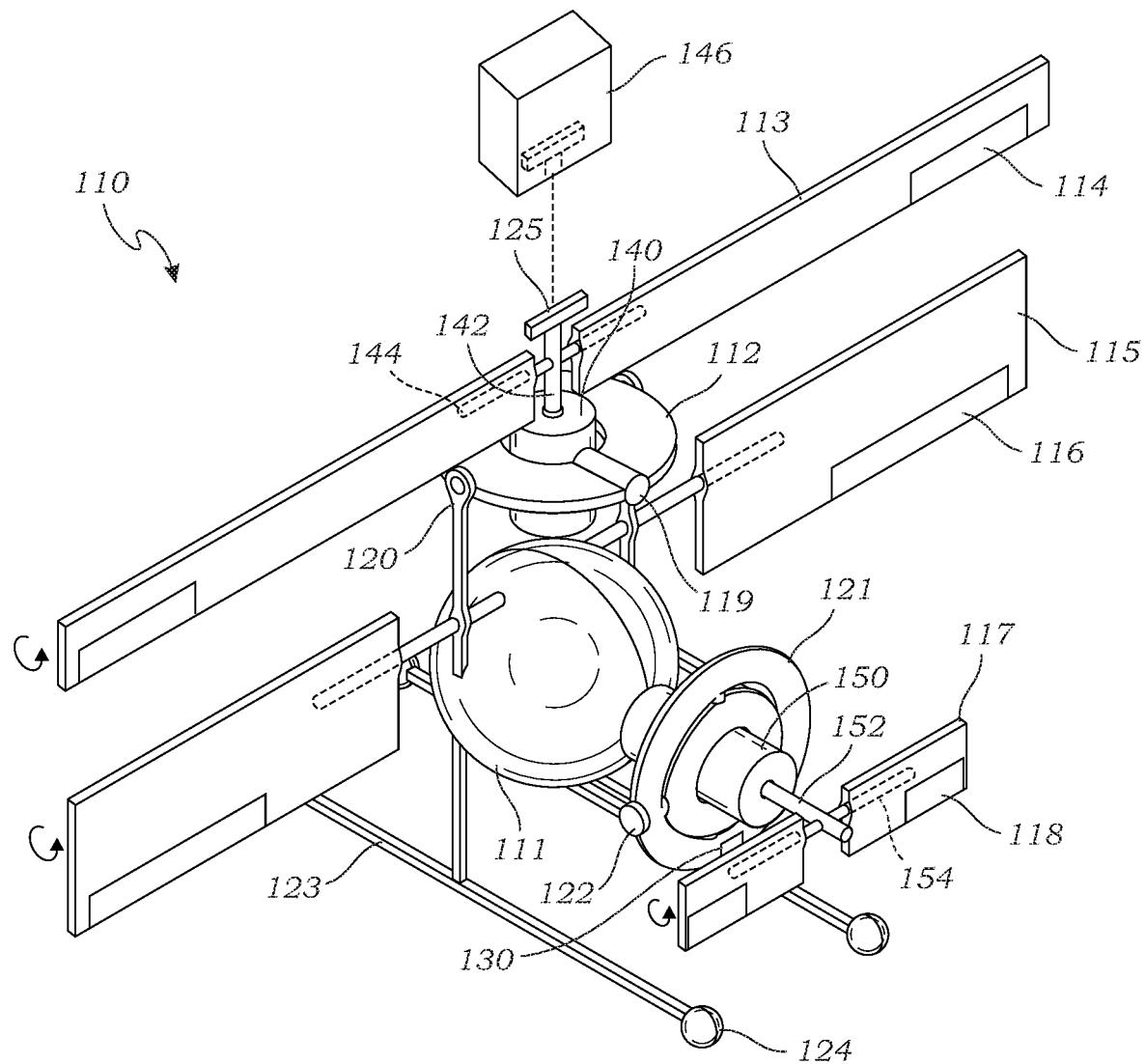
FIG. 1 is a perspective view of an aircraft embodying one embodiment of the present invention.

FIG. 1 is a perspective view of an aircraft 110 embodying one embodiment of the present invention. As illustrated in FIG. 1, in this embodiment the aircraft 110 includes a fuselage 111 pivotally connected with pivot wings 115 having ailerons 116 for roll control in all phases of flight. The pivot wings 115 are vertically oriented, as shown, during vertical takeoff, and pivot to a generally horizontal orientation during horizontal flight so that the pivot wings 115 act as an aircraft wing (similar to the illustration of FIG. 4).

An upper rotary pivot free wing 113 is mounted above the fuselage 111, and is used for vertical thrust during takeoff and in vertical flight. The upper rotary pivot free wing 113 may also be stopped for horizontal flight, as discussed in greater detail below, in which case the upper rotary pivot free wing 113 functions as a lifting free wing for horizontal flight.

The upper rotary pivot free wing 113 may be mounted on a gimbal motor assembly 112 that is vertically mounted above the fuselage 111. A pitch servo 120 is used to control pitch and a yaw servo 119 is used to control yaw in vertical flight. In this embodiment, a motor 140 is mounted within the gimbal motor assembly 112 so that the orientation of a mast 142 of the motor 140 may be adjusted to adjust the vector of the thrust provided by the wings 113. The mast 142 controls the rotation of the wings 113, or alternatively holds them fixed in place when the wings 113 are operating in a fixed wing horizontal flight configuration. Pivot mount mechanisms 144 extend on either side of the mast 142 for pivotally mounting the wings 113.

In this embodiment, the aircraft 110 also includes a means for providing vectored thrust for forward movement of the aircraft. In this embodiment, the means for providing this vectored thrust includes a rotary free wing 117. In alternative embodiments, other forms of thrust may be provided, including any form of thrust (propellers, jets, etc.) known in the art, and any form of vectoring the thrust, including the disclosed gimbal construction, other adjustment mounts known in the art, and any form of adjustable wings, fins, and similar mechanisms. Furthermore, vectored exhaust systems known in the art may alternatively be used.

In this embodiment, the rotary free wing 117 is used for thrust vectoring in horizontal flight.

In this embodiment, the rotary free wing 117 is mounted on a gimbal motor assembly 121 with the pitch servo 122 used for pitch control in horizontal flight. A second servo 130 may also be used for yaw control of the aircraft during horizontal flight. In this embodiment, a motor 150 is mounted within the gimbal motor assembly 121 and supports a mast 152 which pivotally mounts the wings 117 via pivot mount mechanisms 154.

A landing gear assembly 123 may be used to support the aircraft on the ground and can have ground contact elements 124 (e.g., wheels, floats, etc.) attached for parking (or floats for water landings), or any other contact elements known in the art.

A parachute 146 may be attached to an upper connection point 125, which may be mounted on the mast 142, or other suitable mounting place.

Figure 2:
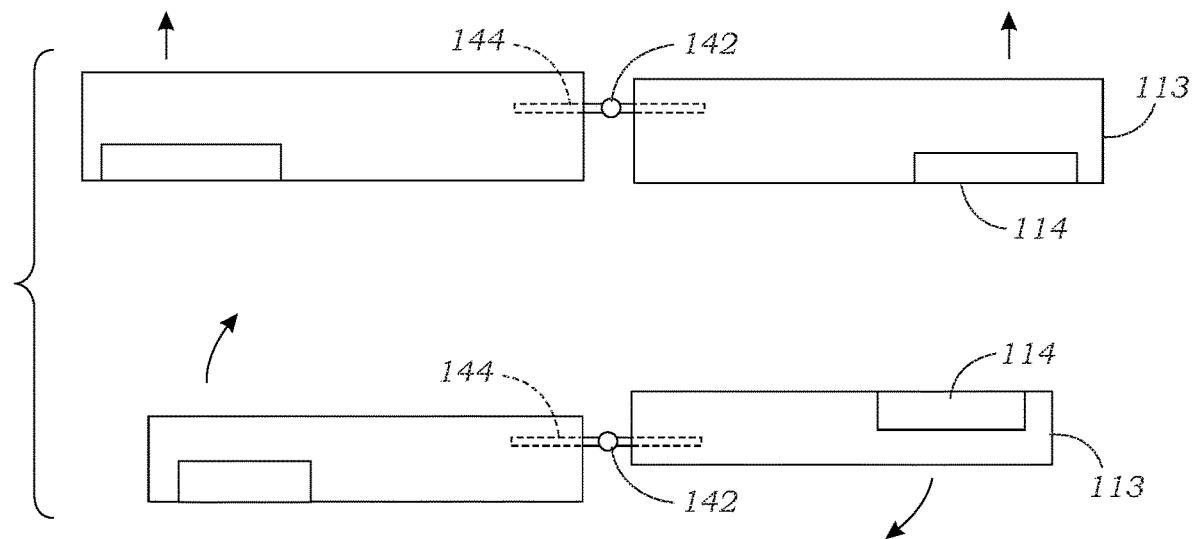
FIG. 2 includes two top plan views of a rotary pivot free wing of the aircraft, comparing when the rotary pivot free wing in a rotated position and in a stopped position.

FIG. 2 includes two top plan views of the rotary pivot free wing 113 of the aircraft of FIG. 1, comparing when the rotary pivot free wing 113 in a stopped state (for horizontal flight), and a rotating state (for vertical takeoff). The ailerons 114 are correctly positioned in either state.

Figure 3:
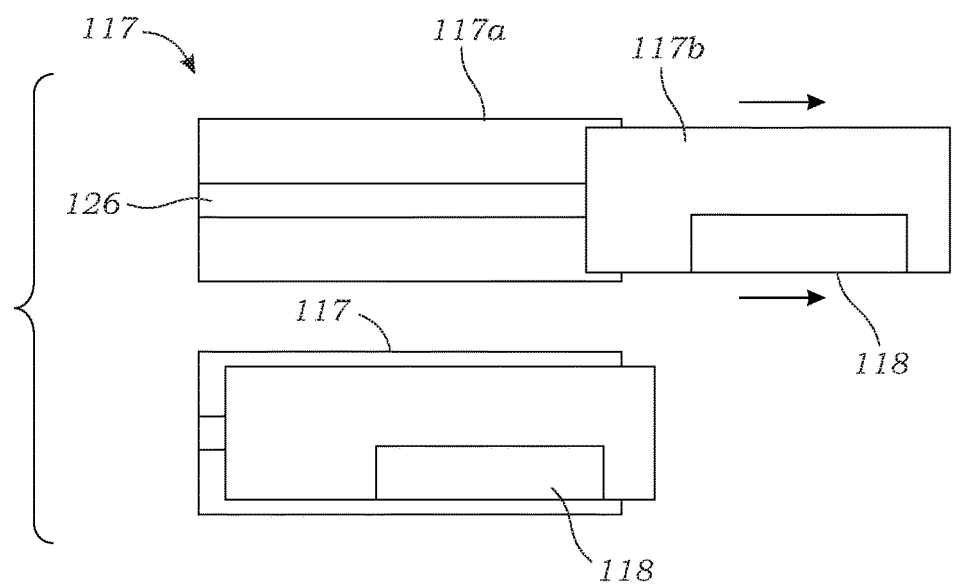
FIG. 3 includes two top plan views of an alternative rotary pivot free wind that includes is able to change a variable diameter, illustrating the rotary pivot free wing in a collapsed position and an extended position.

FIG. 3 includes two top plan views of an alternative rotary pivot free wing 117 that includes is able to change a variable diameter. FIG. 3 illustrates the rotary pivot free wing 117 having a first component 117a and a second component 117b which are slidably engaged with each other. The top illustration is in an extended position, when rotating, and the bottom illustration is in a retracted position. A hydraulic cylinder 126 may be used for extending and retracting the wing components. The other wings described herein may also use this form of construction, if desired by one skilled in the art.

Figure 4:
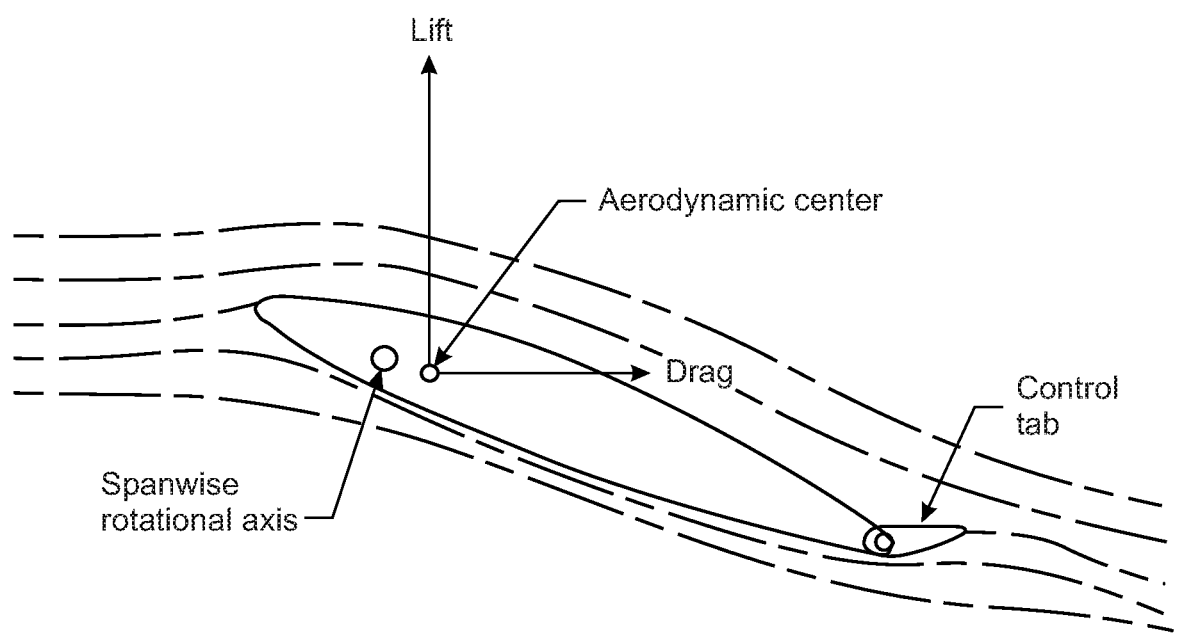
FIG. 4 is a cross-sectional illustration of the rotary pivot free wing of FIG. 2.

FIG. 4 is a cross-sectional illustration of the rotary pivot free wing 113 of FIG. 2. As shown in FIG. 4, the free wing is an aerodynamic lifting surface which is completely free to rotate about a span wise axis, subject only to aerodynamic pitching moments and unrestricted by mechanical constraints. To provide static angle of attack stability, the axis of rotation is located forward of the aerodynamic center of the wing panel. As shown in FIG. 4, the equilibrium angle of attack is established through a balance of moments created by a trailing-edge control surface and the torques produced by the lift and drag forces. With suitable mechanical limitation on control surface displacement the wing cannot be forced into the stall regime. Furthermore, the anti-stall behavior is not influenced by center of gravity variations in the fuselage assembly. The other free wings described herein use these same principles.

An additional major benefit of the free-wing concept is substantial alleviation of the normal load factor response to vertical gusts. The gust alleviation arises from the tendency of a stable lifting surface to maintain a prescribed lift coefficient by responding to the natural pitching moments which accompany changes in flow direction. While all stable aircraft tend to relieve the lift increment due to a vertical gust by pitching into the relative wind, the rapidity of the alleviating motion depends upon the pitching moment of inertia. Because of the greatly reduced inertia of the wing panel, compared to the aircraft as a whole, the free-wing concept provides a significant reduction in the turbulence response.

Figure 5:
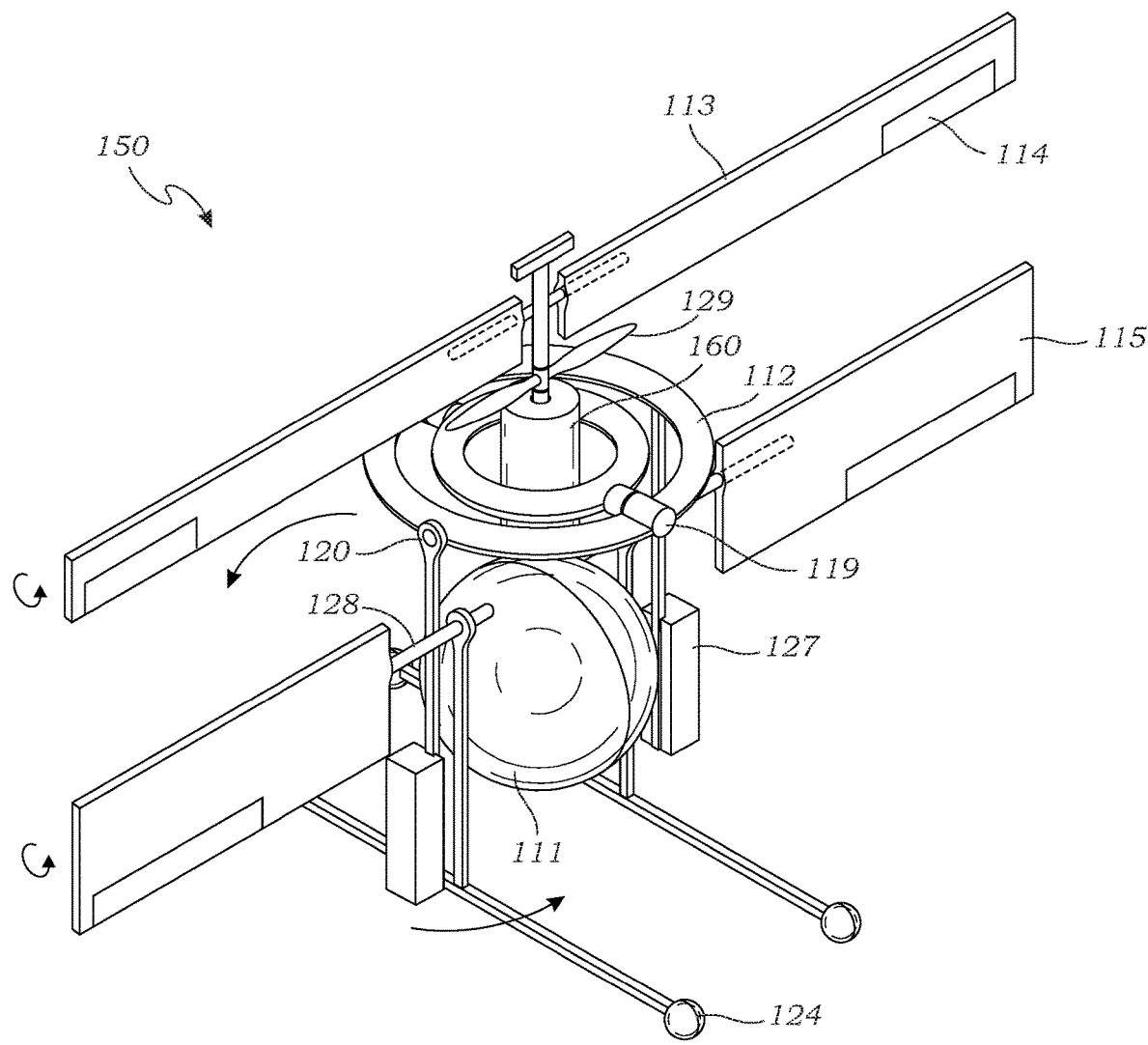
FIG. 5 is a perspective view of an alternate embodiment of the aircraft.

FIG. 5 is a perspective view of an alternate embodiment of the aircraft 150. As shown in FIG. 5, in this embodiment the aircraft 150 mounts the upper rotary pivot free wing 113 and a propeller 129 on a two axis gimbal 112 for thrust vectoring. The upper rotary pivot free wing 113 is used for thrust in the vertical and as a lifting free wing when stopped for cruise. The lower propeller 129 is used for thrust in horizontal flight. The entire assembly (the upper rotary pivot free wing 113, the propeller, and the gimbal 112) are pivotally mounted on struts (or other structure) to pivot points 128 so that the assembly may be pivoted from the vertical orientation (as shown), to a horizontal configuration for horizontal flight. Batteries 127 or other weighted components may be mounted at the other end of the struts, opposite the pivot points 128, to counter balance the gimbal motor assembly, so the center of gravity is always under the center of lift.

Figure 6:
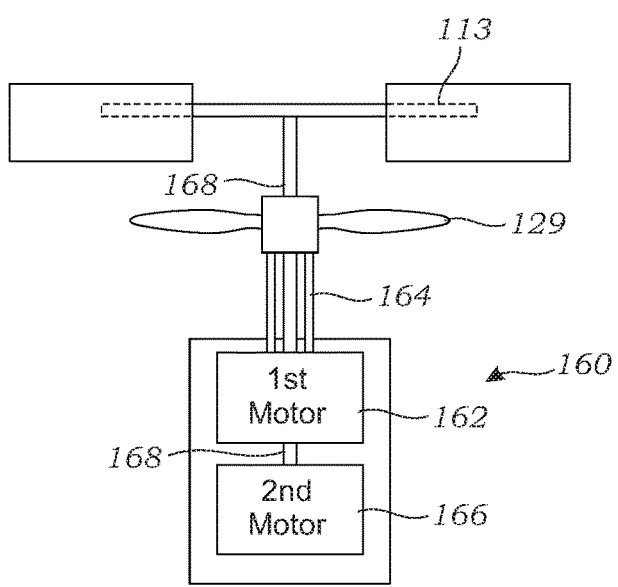
FIG. 6 is a diagram of a drive system used in the aircraft of FIG. 5.

FIG. 6 is a diagram of a drive system 160 which may be used in the aircraft of FIG. 5. As shown in FIG. 6, the aircraft includes a pair of contra rotating coaxial motors, a first motor 162 connected with a drive shaft 164 to the propeller 129; and a second motor 166 connected with a drive shaft 168 which extends within the drive shaft 164 to the wings 113. In this embodiment, they are operably engaged via coaxial drive shafts, although those skilled in the art may devise alternative connections that should be considered within the scope of the present invention.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. An aircraft comprising:

a fuselage;

pivot wings pivotally connected with the fuselage;

ailerons on each of the pivot wings for providing roll control for the aircraft in all phases of flight;

a gimbal motor assembly having a pitch servo and a yaw servo mounted on the fuselage to adjustably support a pair of upper rotary pivot free wings, each mounted on a mast driven by a motor, so that thrust generated by the pair of upper rotary pivot free wings may be vectored as required for various stages of flight;

wherein each of the pair of upper rotary pivot free wings is mounted on the mast via a pivot mounting mechanism that leaves each of the pair of upper rotary pivot free wings completely free to rotate about a span wise axis of rotation without mechanical constraints between a rotating state and a stationary state, wherein the axis of rotation that is located forward of an aerodynamic center of the respective wing, such that when the upper rotary pivot free wing rotates in a powered mode the upper rotary pivot free wing is in the rotating state that provides vertical thrust during takeoff or horizontal thrust in vertical flight, and when the upper rotary pivot free wing is in an unpowered mode the upper rotary pivot free wing is in the stationary state wherein the upper rotary pivot free wing functions as a lifting free wing for horizontal flight; and a means for providing vectored thrust for forward movement of the aircraft.

2. The aircraft of claim 1, wherein the means for providing vectored thrust for forward movement of the aircraft comprises a second motor that is connected via a drive shaft to a propeller, wherein the drive shaft is coaxially aligned with the mast and also mounted on the gimbal motor assembly.

3. The aircraft of claim 2, wherein the propeller is coaxially aligned with the upper rotary pivot free wing.

4. The aircraft of claim 3, wherein the motor driving the pair of upper rotary pivot free wings, and the second motor that drives the propeller, are in the form of contra rotating coaxial motors, and wherein the mast extends coaxially through the drive shaft of the propeller.

\* \* \* \* \*